United States Patent [19]

Sheehy et al.

[11] Patent Number: 4,680,187

[45] Date of Patent: * Jul. 14, 1987

[54] PORTION CONTROLLED SLICED COOKED WHOLE MUSCLE MEAT PRODUCT

[75] Inventors: Roger C. Sheehy, Providence, R.I.; Irwin Muskat, Manchester, N.H.

[73] Assignee: Granite State Packing Company, Inc., Manchester, N.H.

[*] Notice: The portion of the term of this patent subsequent to Mar. 4, 2003 has been disclaimed.

[21] Appl. No.: 810,075

[22] Filed: Dec. 17, 1985

Related U.S. Application Data

[63] Continuation-in-part of Ser. No. 630,362, Nov. 9, 1984, Pat. No. 4,574,087.

[51] Int. Cl.$^4$ ............................................. A23L 1/31
[52] U.S. Cl. .................................... 426/129; 426/645; 426/393; 426/414; 426/513; 426/518; 426/392; 426/404
[58] Field of Search ............... 426/392, 393, 513, 578, 426/404, 413, 414, 392, 647, 129, 645

[56] References Cited

U.S. PATENT DOCUMENTS

| | | | |
|---|---|---|---|
| 2,140,162 | 12/1938 | McKee | 426/518 |
| 2,733,153 | 1/1956 | Hammerberg | 426/513 |
| 2,779,681 | 1/1957 | Sell et al. | 426/513 |
| 3,047,404 | 7/1962 | Vauchan | 426/129 |
| 3,067,041 | 12/1962 | Monteleone | 426/407 |
| 3,370,960 | 2/1968 | Jaccard | 426/513 |
| 3,753,741 | 8/1973 | Stewart | 426/414 |
| 4,072,763 | 2/1978 | Mart | 426/518 |
| 4,363,822 | 12/1982 | Kleptz | 426/393 |

OTHER PUBLICATIONS

Meat Processing, Feb. 1982, pp. 42–43, 45 and 48.
Slice-N-Tact Technical Manual Bettcher Industries 1982.

*Primary Examiner*—R. B. Penland
*Attorney, Agent, or Firm*—Lee A. Strimbeck

[57] ABSTRACT

A portion controlled packaged slice cooked whole muscle boneless cut of meat having the characteristic configuration of that cut is produced by: trimming, cooking and selecting a group of pieces of the cut all of which have a cooked weight within ±6% of the median weight of the group; compacting each piece while still hot from the cooking to a pre-determined length for that group and chilling the pieces while so compacted; setting the number and blade spacing of a single pass multi-blade slicer to suit the pre-determined length of the pieces and produce slices of a pre-determined weight, including the two end slices and passing each piece across grain through the slicer while maintaining the ends of each piece as the piece passes through the slicer under a considerable confining pressure.

12 Claims, 1 Drawing Figure

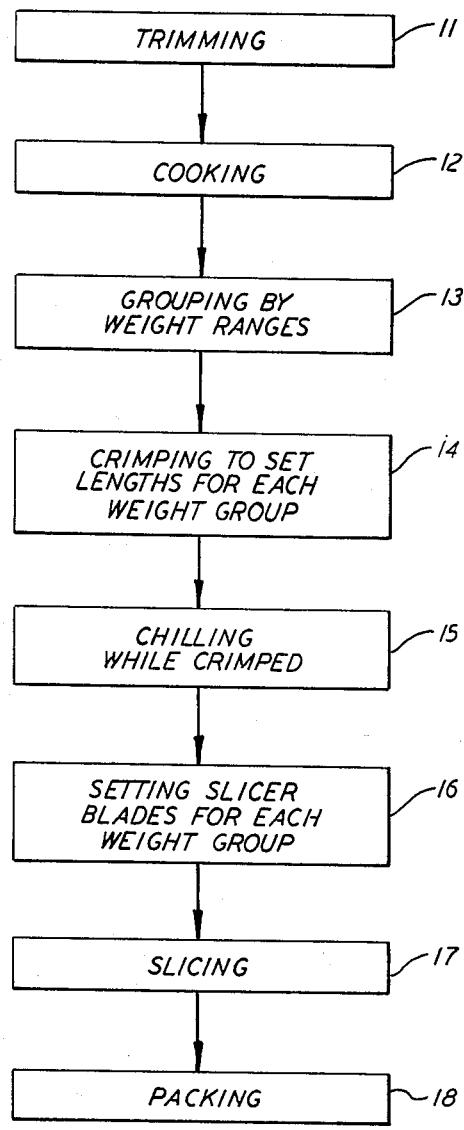

PORTION CONTROLLED SLICED COOKED WHOLE MUSCLE MEAT PRODUCT

RELATED APPLICATIONS

This application is a continuation-in-part of Portion Pre-Sliced Roast Beef Product and Process, Ser. No. 630,362, filed Nov. 9, 1984 by the present inventors, now U.S. Pat. No. 4,574,087, issued Mar. 4, 1986.

INTRODUCTION

This invention pertains to the preparation of a packaged portion controlled pre-sliced whole muscle meat product, such as roast prime ribs or pork loin without appreciable alteration of the natural shape of the cut but with the slices having a uniform weight and thickness. This invention permits the preparation of a packaged cooked beef product cooked rare-to-medium and sliced such that there is some pink in the slices, which product can be stored and shipped without appreciable blooming occurring prior to the package being opened by the consumer. The portion control aspect of this invention is also applicable to cooked whole muscle meat products with which blooming is not a problem, such as well-done prime ribs, but where it is desired that the sliced product as served to the customer have its characteristic configuration so that the customer will not think it is something other than what it is supposed to be.

PRIOR ART

The most relevant prior art known to the applicants is extensively set out in the above patent. The patent is concerned with a process of preparing a whole muscle cooked roast beef that is amenable to being shaped to a uniform cross-sectional shape by massaging the beef and cooking it while in a shaping container. An important element of that invention as applied to the preparation of a sliced roast beef cooked rare-to-medium is the prevention of any appreciable amounts of air from contacting the faces of the slices whereby premature blooming of the packaged sliced roast is avoided. That aspect of the prior invention is also an element of this invention when the present invention is applied to the processing of red-blooded meats subject to blooming.

DESCRIPTION

In brief compass this invention is a process for producing a series of packaged whole muscle cooked meat product having the expected color for the degree of doneness, the slices of which are of a substantially uniform thickness, weight and plate coverage, and to the product produced thereby.

The basis for this invention is the finding that pieces of cooked meat could be set to standard lengths within weight groupings by being compacted or crimped after cooking while still hot followed by cooling while compacted. The compacted pieces then hold the set thus imparted to them sufficiently for a slicing step. This compacting also results in the ends being squared, i.e. being made parallel one to another and perpendicular to the longitudinal axis of the piece. This setting of the pieces to standard lengths prepares them for being sliced in a multi-blade slicer such that the end slices are of substantially the same thickness and weight as the other slices. However, it was found that such compacting alone is not sufficient to achieve the desired object—it was also found that the pieces must be longitudinally confined under pressure during the slicing step and that the amount of confining, while greater than 3%, must be related to the compacted, cooled length of the cooked pieces. Too little or too much confining may result in substantial nonuniform weight and/or thickness of the slices. The amount of confining is determined for each type of meat experimentally.

Slicing of cooked meats with such an extent of confining and pressure is believed not to have heretofore been practised.

If the ends of a cooked compacted piece are not confined in accordance with this invention, they sag or otherwise distort during slicing, causing loss of the end pieces and indeed even loss of the some of the pieces adjacent thereto and slice weights will vary greatly from end-to-end.

As the ends of a cooked, compacted piece are somewhat rounded, the spacing of the two end blades of the slicer from the confining end walls can be set slightly larger than the spacing between blades so that the two end slices have the target weight for the slices.

For the most common sizes of prime ribs, two blade spacings of 0.49 and 0.55 inch are usually all that is required to produce 8 ounce slices, although a spacing of 0.39 inch may occasionally have to be used for very large roasts.

The present process comprises the steps of:

1. Trimming a large number of whole muscle meat pieces of a single cut of meat but of varying weights to remove unwanted fat and gristle and to shape them inasmuch as possible to a uniform cross-sectional shape end-to-end.

2. The pieces are then cooked to a pre-determined degree of doneness.

3. After cooking, the pieces are removed from the oven and while the pieces are still hot they are:

(a) sorted and grouped into weight ranges—at least two and usually at least 5—differing by about ½ pound one from another. Each piece of any group is preferably within ±6% of the median weight of that group; and (b) each weight range group is compacted against the longitudinal axis of the muscle to a pre-determined length for that group. The compacting decreases the length at least 3% but is not sufficient to cause dislocation or buckling of the muscle. The pieces so compacted are then chilled to help them hold the compacted shape. For prime ribs of 10 pounds or more, the piece will be compacted at least ½ inch and at most 2 inches, and usually 1 inch. The chilling will be to less than 40° F. but the meat is not frozen, totally or in part.

4. The so-chilled pieces are then sliced in a single pass multi-blade slicer. The blade spacing and number of blades used are set for the characteristic length for each weight range group for the cut of meat to produce therefrom slices of pre-determined weight including the two end slices.

5. The chilled meat pieces in each group are pushed by a ram one at a time sideways across the grain through a multi-blade slicer while maintaining the ends of the pieces as the piece passes through the slicer under confining pressure to reduce the unrestrained length of the chilled piece by at least 3% without undue distortion of the muscle.

6. As each piece of meat is sliced and removed from the slicer, it is held together so that air cannot contact the faces of the slices. It is then packaged, usually vacuum packaged, for shipping.

By this method, at least 90% of the slices will achieve the target weight ±6% and all will have the target weight ±12%.

The sorting and grouping of the pieces can as well occur after they are trimmed but before they are cooked such that after the cooking the pieces can be directly placed in the compacting molds with a minimum of handling. In the claims, the sorting and grouping specified in 3-a above is intended to encompass sorting and grouping either before or after the cooking.

The present invention is most advantageously applied to the preparation of a portion controlled packaged sliced cooked whole muscle roast prime rib, sirloin strip and pork loin, the slices of which are of a substantally uniform thickness, weight and plate coverage. As applied to a red-blooded meat such as prime rib cooked rare-to-medium, the present invention has the advantage that the slicing and all subsequent steps can be carried out in a manner to virtually exclude air from contacing the faces of facing slices such that premature blooming of the cooked product prior to the customer's opening of the package is substantially if not entirely avoided.

As applied to the preparation of sliced roast prime ribs, usually at least 25 pieces or more will be processed at a time. It is preferred to work with roast prime rib pieces that would weigh at least 10 pounds each before trimming. After cooking, the pieces will be divided into 10 or so weight range groups differing one from another in approximately ½ pound increments. Usually the sliced, roast prime ribs will be split in two or three and packaged, with each package weighing at least 4 pounds, i.e. if the slices are 8 ounces, then each package contains at least 8 slices.

THE DRAWING

The drawing schematically illustrates the steps of this process, the steps illustrated being labelled:
11 Trimming
12 Cooking
13 Grouping by weight ranges
14 Crimping to set lengths for each weight group
15 Chilling while crimped
16 Setting slicer blades for each weight group
17 Slicing
18 Packing

EXAMPLE

This example is directed to the preparation of a portion controlled sliced roast prime rib. This invention is, however, equally applicable to other types of whole muscle products that are not amenable to being shaped by massaging and confinement as described in the above-mentioned patent and/or where it is desired to maintain the characteristic configuration of the cut. As an example and with reference to the drawing, over 125 pieces of boneless whole muscle prime ribs having an average weight of 12 pounds and all of which have a weight greater than 10 pounds, are prepared for the process by first trimming them in step 11 to remove unwanted fat and gristle and to square them as much as possible. It is preferred that the pieces have tails of 2 inches.

Following the trimming, each piece is put in a cooking encasement. As the roasts are encased, they are weighed and grouped into weight ranges differing incrementally about one-half pound one from another. This grouping could as well be done after cooking as indicated by step 13 of the drawing.

In step 12, the roasts are put on a cooking rack and cooked in an oven to a rare-to-medium degree of doneness which is about an internal temperature of 132°–136° F. It may be desired in some instances to use a water bath to cook the pieces.

Immediately after cooking, the ribs are transferred to a compacting or crimping rack to be compressed and held until cooked and chilled. The crimping is done againt the longitudinal axis of the muscle and compresses the ribs ¾'s of an inch to 1 inch or so from their unconfined free length. The compression of the ribs is not sufficient to cause any appreciable dislocation of the muscle. Each weight range group is compacted a predetermined amount based upon experience but all are compacted at least 3%.

After a batch has been put in the compacting rack, the pieces are then chilled in step 15 which helps set the shape.

In step 16 the number of blades and their spacing of a single pass multi-blade slicer are set to produce slices of the desired thickness and weight for the first weight range group to be passed through the slicer. As noted previously, the end blades are spaced slightly further from the confining end walls than the spacing between the blades. If but one slicer is used, which usually will be the case, the number of blades and blade spacing are thereafter reset for each subsequent weight range group passed through the slicer. The slicer used can be the Slice-N-Tact machine described in the aforesaid patent. For example, to produce slices approximately 0.5 inches thick from the cooked prime ribs of this example, each slice of which weighs approximately 8 ounces, ±1 ounce, and which at least 90% of which weigh 8 ounces ±½ ounce, the following number of blades would be used with the Slice-N-Tact machine for each weight range at a blade spacing of 0.49 inch:

| Weight Range, Pounds | Number of Blades |
| --- | --- |
| 9.80–10.25 | 19 |
| 10.25–10.80 | 20 |
| 10.80–11.25 | 21 |
| 11.25–11.80 | 22 |
| 11.80–12.25 | 23 |
| 12.25–12.80 | 24 |
| 12.80–13.25 | 25 |
| 13.25–13.80 | 26 |
| 13.80–14.25 | 27 |

As a roast is pushed through the slicer under the action of a ram, its ends are compressed by the confining end walls to maintain the longitudinal axis of the muscle under pressure which is sufficient to reduce the unrestrained length of the cooked meat by at least 3%. It is believed that this maintaining of the meat under such pressure during slicing has not heretofore been practised. The purpose of this is to assure that the two end pieces of the roast are aptly confined and shaped so that they too will have the target weight for the slices such that there will be no underweight pieces that have to be discarded.

A top comb such as is shown in U.S. Pat. No. 3,753,741 (Stewart) is preferably used to help guide the piece. It is set to rest firmly on the piece.

The slices are held together, as they emerge from the slicer and packaged, usually vacuum packaged, so that air is virtually excluded from the faces of the slices.

The skilled in the art will appreciate that the process of this invention produces a unique product characterized by the fact that while sliced the product is packaged in the customary or conventional configuration as if unsliced, which satisfies customer expectations, and by the fact that the slices are portion controlled, i.e. each of them have about the same weight and thickness from end-to-end of the product.

As applied to a cut such as prime ribs, the invention offers particular advantages inasmuch as the process permits of the slicing and packaging of the meat in a manner to substantially or virtually exclude air from contacting the faces of facing slices. Thus, if the cut is cooked rare-to-medium there will be essentially no premature blooming.

We claim:

1. A process of producing a series of portion controlled sliced cooked whole muscle boneless meat selected from the group consisting of roast prime rib, sirloin strip and pork loin, the slices of which are of a substantially uniform thickness, weight and plate coverage, comprising the following steps:
   (1) trimming a batch of at least 25 pieces of said whole muscle boneless meat;
   (2) cooking the pieces to a pre-determined degree of doneness;
   (3) removing said pieces from the cooking means and while said pieces so cooked are still hot:
      (a) sorting and grouping each of said pieces into at least two weight ranges, A and B;
      (b) compacting the pieces in each weight range group against the longitudinal axis of the muscle to a pre-determined length for each of said weight ranges;
      (c) chilling each piece while so compacted;
   (4) setting the blade spacing and number of blades of a first single pass multi-blade slicer to suit said pre-determined length for said weight range A group of said pieces as crimped as stated in step 5, and produce slices therefrom of a pre-determined weight for each slice including the two end slices;
   (5) passing said pieces of said weight range A group while still chilled one at a time across the grain through said multi-blade slicer while maintaining the ends of a piece as it passes therethrough under a confining pressure to reduce the unrestrained length of each piece by at least 3% but without dislocation or buckling of the muscle thereby cutting each piece into slices of said predetermined weight including the two end slices;
   (6) setting the blade spacing and number of blades of a second single pass multi-blade slicer to suit said pre-determined length for said weight range B group of pieces and product slices therefrom of said pre-determined weight for each slice including the two end slices;
   (7) passing said pieces of said weight range B group one at a time sideways through said second single pass multi-blade slicer while maintaining the ends of a piece as it passes therethrough under a confining pressure to reduce the unrestrained length of each piece by at least 3% but without dislocation or buckling of the muscle; and
   (8) vacuum packing said pieces so sliced for shipment, said slicing and all steps subsequent thereto being done in a manner to virtually exclude air from contacting the faces of facing slices.

2. The process of claim 1 wherein but one single pass multi-blade slicer is used and the blades thereof are reset after slicing said weight range A group to slice said weight range B group.

3. The process of claim 1 wherein said pieces in step 2 are cooked rare-to-medium and the slices remain free of any appreciabile blooming prior to unpackaging.

4. The process of claim 1 wherein:
   (a) the pieces as received for step 1 weigh at least 10 pounds each;
   (b) the compacting in step 4, part a, is at least ½ inch; and
   (c) at least 90% of the slices produced thereby have said pre-determined weight ±6%, and substantially all have said pre-determined weight ±12%.

5. The process of claim 4, as applied to roast prime ribs and wherein
   (a) in step 3, part a, the pieces are sorted into at least five of said weight ranges, A through E, with there being approximately a 0.5 pound difference from one weight range to the next; and
   (b) in steps 5 and 7 said blade spacing is about 0.49 inches, and the number of blades used in said single pass multi-blade slicer is as follows:

| Weight Range, Pounds | Number of Blades |
| --- | --- |
| 9.80–10.25 | 19 |
| 10.25–10.80 | 20 |
| 10.80–11.25 | 21 |
| 11.25–11.80 | 22 |
| 11.80–12.25 | 23 |
| 12.25–12.80 | 24 |
| 12.80–13.25 | 25 |
| 13.25–13.80 | 26 |
| 13.80–14.25 | 27 | the slices produced thereby weighing 8 ounces ±½ ounce.

6. A process of producing a series of packaged sliced whole muscle cooked meat product, the slices of which are of a substantially uniform thickness, weight and plate coverage, comprising the following steps:
   (1) trimming a batch of at least 25 whole muscle boneless meat pieces of a single cut of meat but of varying weights;
   (2) cooking the pieces to a pre-determined degree of doneness in a cooking means;
   (3) removing said pieces from said cooking means and while said pieces so cooked are still hot;
      (a) sorting and grouping each of said pieces into weight ranges;
      (b) compressing the pieces in each weight range against the longitudinal axis of the muscle to a pre-determined length for each of said weight ranges;
      (c) chilling each piece while so compressed;
   (4) setting the blade spacing and number of blades of a single pass multi-blade slicer to suit said pre-determined length for one of said weight ranges and produce slices from the pieces therein of a pre-determined weight for each slice, including the two end slices;
   (5) passing said pieces of said one weight range while still chilled one at a time sideways through said multi-blade slicer while maintaining the ends of a piece as the piece passes therethrough under confining pressure to reduce the unrestrained length of each piece by at least 3% but without dislocation or buckling of the muscle thereby cutting each piece into slices of said predetermined weight including the two end slices;

(6) similarly setting the blade spacing and number of blades of a single pass multi-blade slicer to suit said pre-determined length for each of the remaining weight ranges and produce slices from the pieces therein of said pre-determined weight for each slice including the two end slices;

(7) passing the pieces of each said weight range one at a time through said multi-blade slicer so set for that group while maintaining the ends of each piece as the piece passes therethrough under confining pressure to reduce the unrestrained length of each piece by at least 3% but without distortion of the muscle; and (8) packing said pieces so sliced for shipment.

7. The process of claim 6 wherein in step (3 a) said pieces are sorted into at least 5 weight ranges and a single multi-blade slicer used for slicing, being reset for each weight range.

8. A process of producing a series of portion controlled packaged sliced cooked whole muscle cuts of meat, while maintaining the characteristic configuration thereof, the slices of which are of a substantially uniform thickness, weight and plate coverage, comprising the following steps:

(a) compacting a group of at least several pieces of a cooked whole muscle boneless single cut of meat each of which has a cooked weight within ±6% of the median weight of said group, said compacting being done while said pieces are still hot from the cooking and by wedging each piece between confining end walls so that the piece is compacted along the longitudinal axis ofthe muscle to a single pre-determined length for the pieces of said group;

(b) chilling each piece while so compacted;

(c) setting the blade spacing and number of blades of a single pass multi-blade slicer to suit said pre-determined length as crimped in step (d) and produce slices therefrom of a pre-determined weight for each slice including the two end slices;

(d) passing said pieces while still chilled one at a time across grain through said multi-blade slicer while maintaining the ends of a piece as the piece passes therethrough under a confining pressure to reduce the unrestrained length of each piece by at least 3% but without dislocation or buckling of the muscle, thereby cutting each piece into slices of said predetermined weight including the two end slices; and (e) packing said pieces so sliced for shipment.

9. The process of claim 8 wherein said pieces are cooked rare-to-medium and said slicing and all steps subsequent thereto being done in a manner to virtually exclude air from contacting the faces of facing slices.

10. The process of claim 8 wherein said single cut of meat is prime rib, wherein said pieces are each compacted at least ½ inch in step (a), and wherein said pieces are chilled to below 40° F. in step (b) but are not frozen, totally or in part.

11. A packaged portion controlled sliced cooked whole muscle meat product comprising as a member of a series thereof, a cooked boneless whole muscle of meat sliced uniformly from end-to-end each slice of which has a weight in the range of ±12% of the median weight of all the slices from said series, and vacuum packaged in the chacteristic configuration of said whole muscle of meat, the slicing and packaging thereof being done in a manner to have virtually excluded air from contacting the faces of facing slices.

12. The product of claim 11 when said whole muscle is a prime rib and the package weighs at least 4 pounds, at least 90% of the slices from said series having a weight in the range of ±6% of the median weight of the slices.

* * * * *